(12) United States Patent
Komai

(10) Patent No.: US 7,111,251 B2
(45) Date of Patent: Sep. 19, 2006

(54) SCHEDULE MANAGEMENT APPARATUS, SCHEDULE MANAGEMENT METHOD, AND COMPUTER-READABLE RECORDING MEDIUM STORING SCHEDULE MANAGEMENT PROGRAM

(75) Inventor: Hiroyuki Komai, Inagi (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 09/765,631

(22) Filed: Jan. 22, 2001

(65) Prior Publication Data
US 2002/0059168 A1 May 16, 2002

(30) Foreign Application Priority Data
Jul. 10, 2000 (JP) .............................. 2000-208299

(51) Int. Cl.
G06F 3/00 (2006.01)
G06F 17/60 (2006.01)
(52) U.S. Cl. ...................... 715/844; 715/785; 715/963; 705/8
(58) Field of Classification Search ........ 345/784–785, 345/781, 963; 705/8–9; 715/810–845, 784–785, 715/963
See application file for complete search history.

(56) References Cited
U.S. PATENT DOCUMENTS 5,623,613 A * 4/1997 Rowe et al. ................. 345/841
5,936,625 A * 8/1999 Kahl et al. ................... 345/775
6,323,883 B1 * 11/2001 Minoura et al. ............. 345/784
6,661,437 B1 * 12/2003 Miller et al. ................. 345/810
6,664,984 B1 * 12/2003 Schlarb et al. .............. 345/826

FOREIGN PATENT DOCUMENTS

| JP | 4-243475 | 8/1992 |
| JP | 5-158886 | 6/1993 |
| JP | 7-36982 | 2/1995 |
| JP | 8-305752 | 11/1996 |

OTHER PUBLICATIONS

IBM Technical Disclosure Bulletin, "Dynamic Icon Presentation" (Sep. 1992).*

* cited by examiner

Primary Examiner—Sy D. Luu
(74) Attorney, Agent, or Firm—Staas & Halsey LLP

(57) ABSTRACT

The present invention provides a schedule management apparatus for managing and displaying entered schedules. The schedule display control unit displays a schedule in a schedule display frame corresponding to the date of the monthly schedule table. The display switching unit automatically switches, when there are a plurality of schedules, a schedule displayed in the schedule display frame to another schedule at prescribed switching time intervals.

23 Claims, 14 Drawing Sheets

FIG. 1 PRIOR ART

| | SUNDAY | MONDAY | TUESDAY | WEDNESDAY | THURSDAY | FRIDAY | SATURDAY |
|---|---|---|---|---|---|---|---|
| | 1998/8/30 | 31 | 9/1 ▶◀ MEETING | 2 | 3 | 4 | 5 |
| | 6 | 7 ▶◀ 13:00 BUS. | 8 ▶◀ 13:00 ARR. | 9 | 10 ▶◀ | 11 | 12 |
| | 13 | 14 | 15 | 16 | 17 | 18 ▶◀ MEETING | 19 |
| | 20 | 21 TRIP | 22 | 23 ▶◀ MEETING | 24 ▶◀ | 25 LEAVE | 26 |
| | 27 ▶◀ LEAVE | 28 | 29 | 30 ▶◀ MEETING | 10/1 | 2 | 3 |

BASIC : MONTHLY SCHEDULE

FILE(F) EDIT(E) DISPLAY(V) FUNCTION(W) LAYOUT MOVE(G) SETTING(S) TOOL(T) HELP(H)

BASIC:MONTHLY SCHEDULE | BASIC:WEEKLY SCHEDULE | BASIC:DAILY SCHEDULE | BASIC:OPERATION ITEM | BASIC:CONTACT | BASIC:ADDRESS

F I G. 2
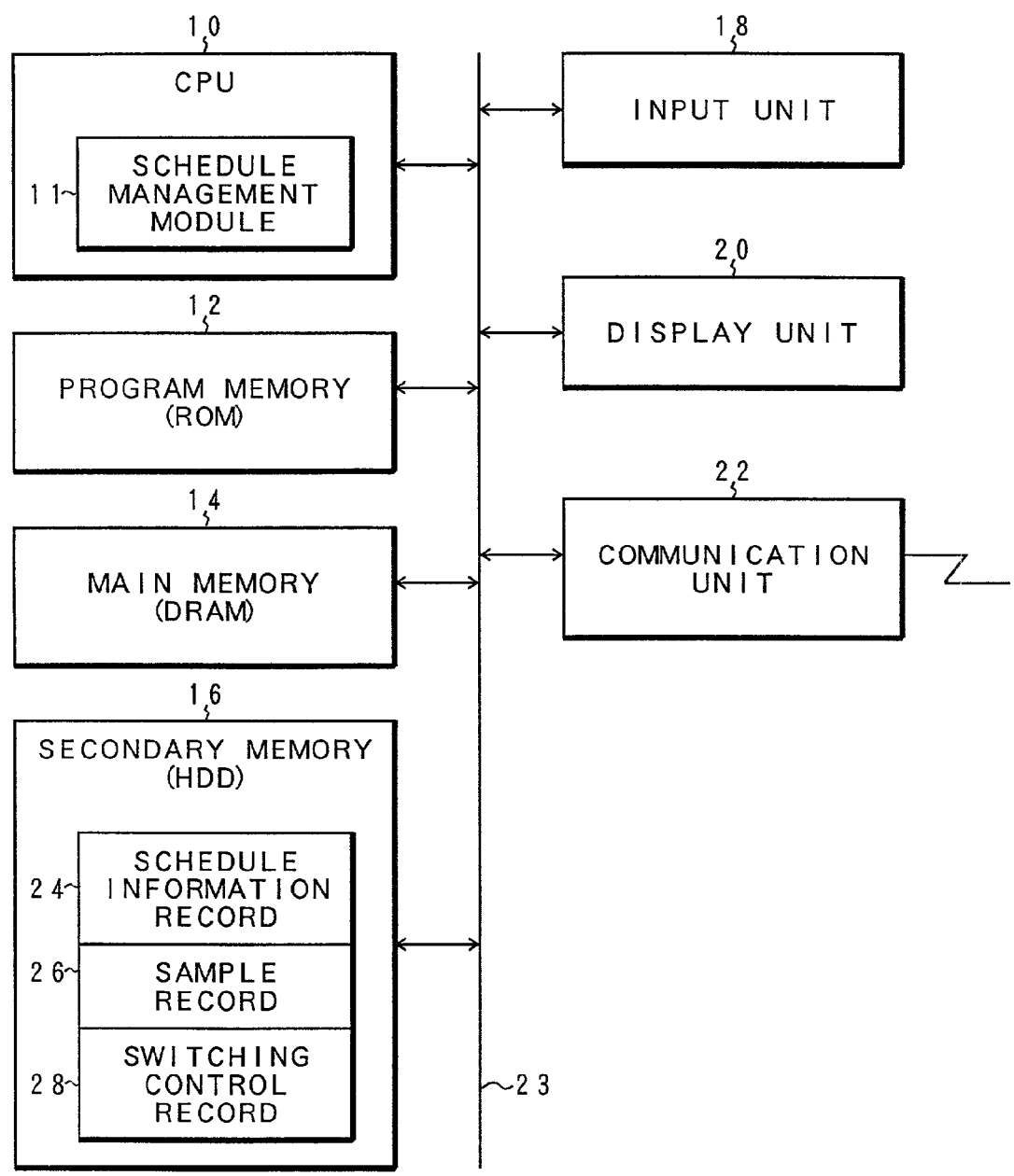

FIG. 4

| BASIC : MONTHLY SCHEDULE | | | | | | |
|---|---|---|---|---|---|---|
| FILE(F) EDIT(E) DISPLAY(V) FUNCTION(W) LAYOUT MOVE(G) SETTING(S) TOOL(T) HELP(H) | | | | | | |
| BASIC:MONTHLY SCHEDULE | BASIC:WEEKLY SCHEDULE | BASIC:DAILY SCHEDULE | BASIC:OPERATION ITEM | BASIC:CONTACT | BASIC:ADDRESS | |
| SUNDAY | MONDAY | TUESDAY | WEDNESDAY | THURSDAY | FRIDAY | SATURDAY |
| 1998/12/27 | 28 | 29 | 30 | 31 | 1/1 | 2 |
| 3 | 4 | 5 | 6 | 7 | 8 | 9 |
| 10 | 11 | 12 ▲▼ SCH.1 10:30 | 13 | 14 | 15 | 16 |
| 17 | 18 | 19 | 20 | 21 | 22 | 23 |
| 24 | 25 | 26 | 27 | 28 | 29 | 30 |

FIG. 6

| | 48-1 |
|---|---|
| ID | 001 |
| CASE | SCHEDULE 1 |
| PLACE | RECEPTION ROOM B |
| CONTENTS | ARRANGEMENT OF PATENT APPLICATION |
| START DATE | 1998/12/29 10:30 |
| END DATE | 1998/12/29 11:30 |
| CLASSIFICATION | |
| REQUESTER | MR. X |
| REQUESTED | MR. Y |
| PRIORITY | STANDARD |
| DISPLAY COLOR | BLUE |
| EVENT | ON |
| SECRET | ON |

BASIC : WEEKLY SCHEDULE

FILE(F)  EDIT(E)  DISPLAY(V)  FUNCTION(W)  LAYOUT MOVE(G)  SETTING(S)  TOOL(T)  HELP(H)

| BASIC:MONTHLY SCHEDULE | BASIC:WEEKLY SCHEDULE | BASIC:DAILY SCHEDULE | BASIC:OPERATION ITEM | BASIC:CONTACT | BASIC:ADDRESS |

| | 1/17 (SUNDAY) | 18 (MONDAY) | 19 (TUESDAY) | 20 (WEDNESDAY) | 21 (THURSDAY) | 22 (FRIDAY) | 23 (SATURDAY) |
|---|---|---|---|---|---|---|---|
| 9 | | | | | | | |
| 10 | | | | | | | |
| 11 | | | | | | | |
| 12 | | | | | | | |
| 13 | | | | | | | |
| 14 | | | | | | | |
| 15 | | | | | | | |
| 16 | | | | | | | |

64
74
76

SCHEDULE MANAGEMENT APPARATUS, SCHEDULE MANAGEMENT METHOD, AND COMPUTER-READABLE RECORDING MEDIUM STORING SCHEDULE MANAGEMENT PROGRAM

BACKGROUND OF THE INVENTION

1. Field of the Invention

The present invention relates to a schedule management apparatus and a schedule management method which display a schedule in response to a date frame of a schedule table such as a monthly schedule or a weekly schedule, and a computer-readable recording medium storing a schedule management program. More particularly, the invention relates to a schedule management apparatus and a schedule management method for displaying a case name of schedule in a limited space in a date frame of a schedule table, and a computer-readable recording medium storing a schedule management program.

2. Description of the Related Arts

In an information processing equipment for use by a person or a group such as a portable terminal or a personal computer, it is the conventional practice to use an information management system known as PIM (personal information manager) or PD (personal data assistant). Such an information management system incorporates a schedule table management function for preparing and managing schedule tables. When a monthly schedule is selected in a conventional schedule table management function, a calendar-type monthly schedule table 200 is displayed as shown in FIG. 1. In this monthly schedule table 200, a schedule display showing a time of the day and contents such as "16:00 Business" is conducted in a schedule display frame 204, as in a date frame 202 of, for example, 9/7. The abbreviation "Business NEG" as used here means a "business negotiation". When there are a plurality of schedules within a day, a scroll button 206 is displayed in the date frame 202, and contents of display in the schedule display frame 204 are sequentially displayed through switching by pressing the scroll button 206 with the mouse. There is another schedule display of "13:00 Arrangement" for 9/8. The schedule displays such as "Meeting" for 9/1 and "Meeting" for 9/8 are event displays fixedly displaying details of the schedule: an event display is also a schedule.

In such a conventional schedule management apparatus, however, when a plurality of schedules are set for a day or the contents of schedule cannot fully be displayed within the schedule display frame, it is necessary to press down the scroll button or operate the keyboard for confirmation of the schedule, and this troublesome operation for confirming a schedule has been a problem in the conventional art.

SUMMARY OF THE INVENTION

According to the present invention, developed in view of the conventional problem as described above, there are provided a schedule management apparatus and a schedule management method which permit easy confirmation of schedules without the need of troublesome operations, and a computer-readable recording medium storing a schedule management program.

The invention provides a schedule management apparatus causing a managed schedule to be displayed, comprising a schedule display control unit which causes display of a schedule in a corresponding schedule display frame, and a display switching unit which switches over the contents of display in the schedule display frame in which the schedule is displayed to another at prescribed time intervals. As a result, even when there are a plurality of schedules in a day, the displayed schedule is automatically switched over at set time intervals and all the schedules can be easily confirmed without the need to operate the scroll button on the keyboard.

When there are a plurality of schedules, the display switching unit switches over the contents displayed in the schedule display frame in units of schedule. The display switching unit has a time specifying unit which specifies an arbitrary switching time interval. The display switching unit switches over the display contents by any of the collective switching method, the longitudinal scroll switching method and the transverse scroll switching method of the display contents relative to the schedule display frame. The display switching unit has a switching method selecting unit which selects a switching method of the display contents relative to the schedule display frame. Furthermore, the display switching unit has a switching display frame specifying unit which specifies one or more schedule display frames in which the display contents are to be displayed. The switching display frame specifying unit switching-displays a schedule by specifying all the schedule display frames, the schedule display frame for the day, or the schedule display frames for a period from the day to a prescribed number of days ahead. The possibility to specify the range of automatic switching of a plurality of schedules provides further easiness of use and convenience. The schedule display control unit displays a monthly schedule table or a weekly schedule table, and displays a schedule in one or more schedule display frames in date frames of the monthly schedule table and the weekly schedule table. The display switching unit switching-displays the schedule in the schedule display frame.

The present invention provides also a schedule management method for causing a schedule to be displayed, the method comprising a schedule display controlling step of causing display of a schedule in a corresponding schedule display frame; and a display switching step of switching over display contents in the schedule display frame in which the schedule is displayed to another contents. When there are a plurality of schedules, the display switching step switches over the contents displayed in the schedule display frame in units of schedule. The display switching step has a time specifying step which specifies an arbitrary switching time interval as described above. The display switching step switches over the display contents by any of the collective switching method, the longitudinal switching method and the transverse switching method of the display contents relative to the schedule display frame. For this purpose, the display switching step has a switching method selecting step which selects a switching method of the display contents relative to the schedule display frame. Furthermore, the display switching step has a switching display frame specifying step specifying one or more schedule display frames for switching over and displaying the display contents. The switching display frame specifying step switching-displays the schedule by specifying all the schedule display frames, the schedule display frame for the day, or the schedule display frame for a period from the day to a prescribed number of days ahead. The schedule display step displays a monthly schedule table or a weekly schedule table, and displays the schedule in one or more schedule display frames in the date frames of the monthly schedule table and the weekly schedule table, and the display switching step switching-displays the schedule in the schedule display frame.

Furthermore, the present invention provides a computer-readable recording medium storing a schedule management program. More specifically, mounting steps of the recording medium onto a computer comprise a schedule display controlling step of causing display of a schedule in a corresponding schedule display frame, and a display switching step of switching over the display contents in the schedule display frame displaying the schedule to another contents. When there are a plurality of schedules, the display switching step of the schedule management program switches over the display contents in the schedule display frame in units of schedule. The display switching step has a time specifying step which specifies an arbitrary switching time interval described above. The display switching step switches over the display contents by any of the collective switching method, the longitudinal scroll switching method and the transverse scroll switching method relative to the schedule display frame. The display switching step has a switching method selecting step which selects a switching method of the display contents relative to the schedule display frame. In addition, the display switching step of the schedule management program causes the computer to execute the switching display frame specifying step for specifying one or more schedule display frames by switching-displaying the display contents. Furthermore, the switching display frame specifying step of the schedule management program switching-displays the schedule information by specifying all the schedule display frames, the schedule display frame for the day, or the schedule display frames for a period from the day to a prescribed number of days ahead. The schedule display step of the schedule management program displays a monthly schedule table or a weekly schedule table, and displays the schedule in one or more schedule display frames in the date frames of the monthly schedule table and the weekly schedule table, and the display switching step switching-displays the schedule in the schedule display frame.

The above and other objects, features, and advantages of the present invention will become more apparent from the following detailed description with reference to the drawings.

BRIEF DESCRIPTION OF THE DRAWINGS

FIG. 1 is a descriptive view of a plurality of schedule displays in a conventional monthly schedule table;

FIG. 2 is a block diagram of a typical hardware configuration of the present invention;

FIG. 4 is a descriptive view of a display screen of a monthly schedule table display-controlled by the invention;

FIG. 6 is a descriptive view of a schedule information record;

FIG. 8 is a descriptive view of a display screen of a monthly schedule table display-controlled by the invention in full size;

FIG. 9 is a descriptive view of a display screen of a weekly schedule table display-controlled by the invention;

DETAILED DESCRIPTION OF THE PREFERRED EMBODIMENTS

Figure 3:
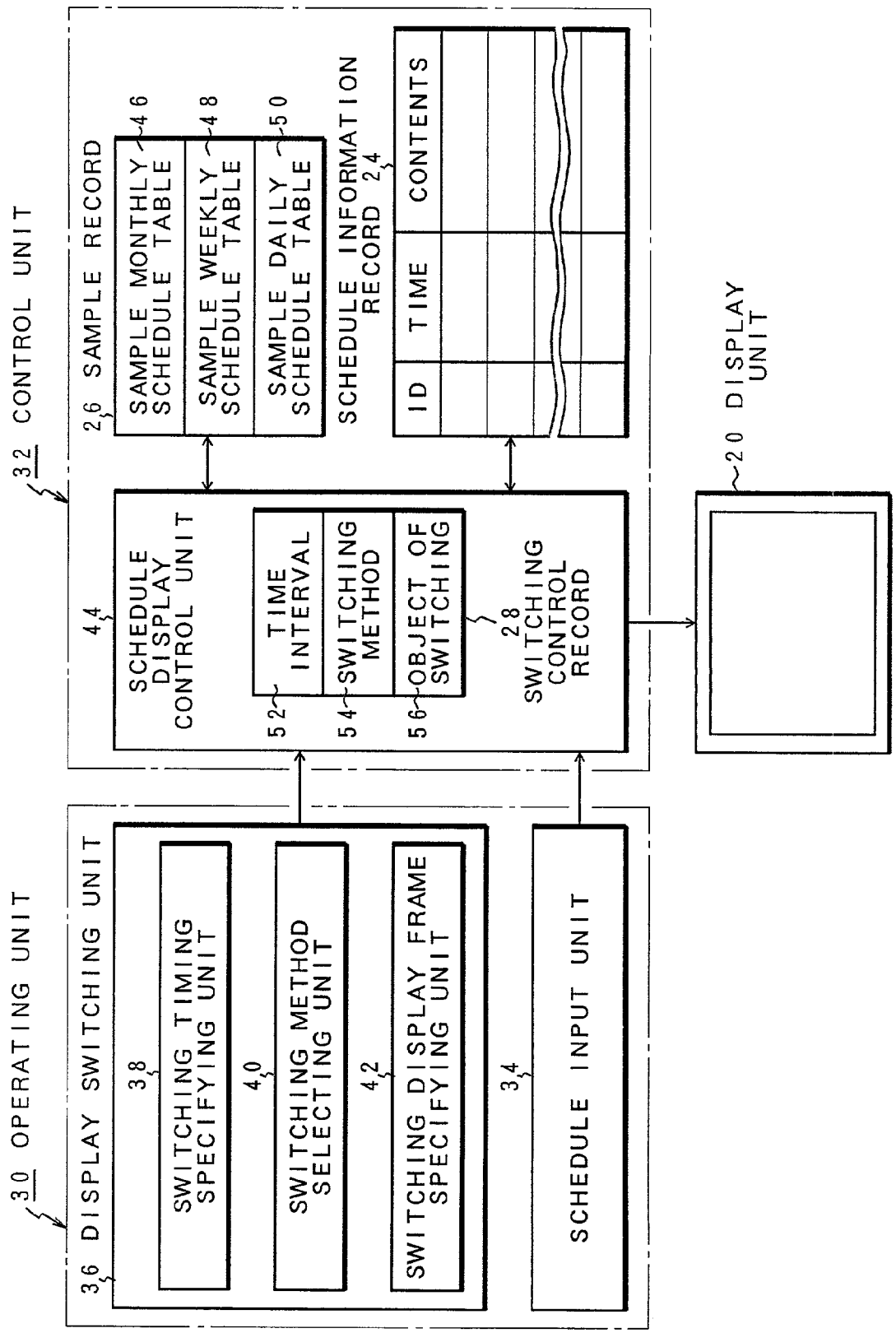
FIG. 3 is a functional block diagram of the schedule management apparatus of the invention.

FIG. 2 illustrates a typical hardware configuration to which the schedule management apparatus of the present invention is applied. The schedule management apparatus of the invention comprises a CPU 10, a program memory 12 using an ROM, a main memory 14 using a PRAM, a secondary memory 16 using a hard disk drive (HDD), an input unit 18 using a keyboard, a mouse and a touch pen tablet, a display unit 20 using a display such as a CRT or a liquid crystal, and a communication unit 22 performing communication with an external unit. Schedule management apparatus to which the invention is applicable include appropriate information apparatuses such as a portable information terminal device and a personal computer. The CPU 10 has a schedule management module 11 for the schedule management apparatus of the invention achieved through program control. The schedule management module 11 is achieved, for example, by an application program provided as PIM or PDA. The schedule management module 11 covered by the invention manages and displays an entered schedule, and is provided with a schedule display control function which displays a schedule in a schedule display frame corresponding to a date of a schedule table, and a display switching function which, when there are a plurality of schedules, sequentially switches over schedules displayed in the schedule display frame to the next schedule at prescribed switching time intervals. For the purpose of displaying a schedule and display-switching in the schedule management module 11, the secondary memory 16 stores a schedule information record 24, a sample record 26 and a switching control record 28. Upon carrying out schedule display processing with the schedule management module 11, they are exploded in the main memory and to display the schedule table and switching-display the schedule displayed in the schedule table.

FIG. 3 is a functional block diagram of the schedule management apparatus of the invention achieved by the schedule management module shown in FIG. 2. The schedule management apparatus of the invention comprises an operating unit 30, a control unit 32, and a display unit 20. A schedule input unit 34 and a display switching unit 36 are provided in the operating unit 30. A switching time specifying unit 38, a switching method selecting unit 40, and a switching display frame specifying unit 42 are provided in the display switching unit 36. The control unit 32 has a schedule display control unit 44. For control purposes of schedule display by the schedule display control unit 44, a schedule information record, a sample record 26 and a switching control record 28 stored in the secondary memory 16 shown in FIG. 2 are deployed as data and control parameters. The schedule display control unit 44 displays, for example, a monthly schedule table 66 shown in the schedule table screen of FIG. 4 on the display unit 20, with reference to the schedule information record 24 based on schedule information entered from the schedule input unit 34. The monthly schedule table 66 is displayed on the basis of a monthly schedule table sample 46 shown in FIG. 3, by operating a monthly schedule selecting button 65 provided on top of the schedule table screen 64 with the mouse. The monthly schedule table 66 presents the case of January 1999 as an example, and date numbers 1 to 30 are shown in the respective date frames from January 1 to 30. In this monthly schedule table 66, for example, as shown in the date frame 68 for January 12, when there is a corresponding schedule in the schedule information record 24, the schedule display frame 70 is displayed, showing therein a schedule "Schedule 1 10:30". Since there are a plurality of schedules for January 12, a scroll button 72 for switching-displaying the contents of the schedule display frame 70 is displayed at top right of the data frame 68. The function of switching over the schedule in the schedule display frame 70 by pushing down this scroll button 72 with the mouse is the same as in the conventional apparatus shown in FIG. 1. In addition, in the invention, by previously specifying automatic switching of schedule through the display switching unit 36 shown in FIG. 3, the schedule is automatically switched over so that the schedule displayed in the schedule display frame shown in FIG. 4 becomes the next schedule at a switching time interval specified then.

Figure 5:
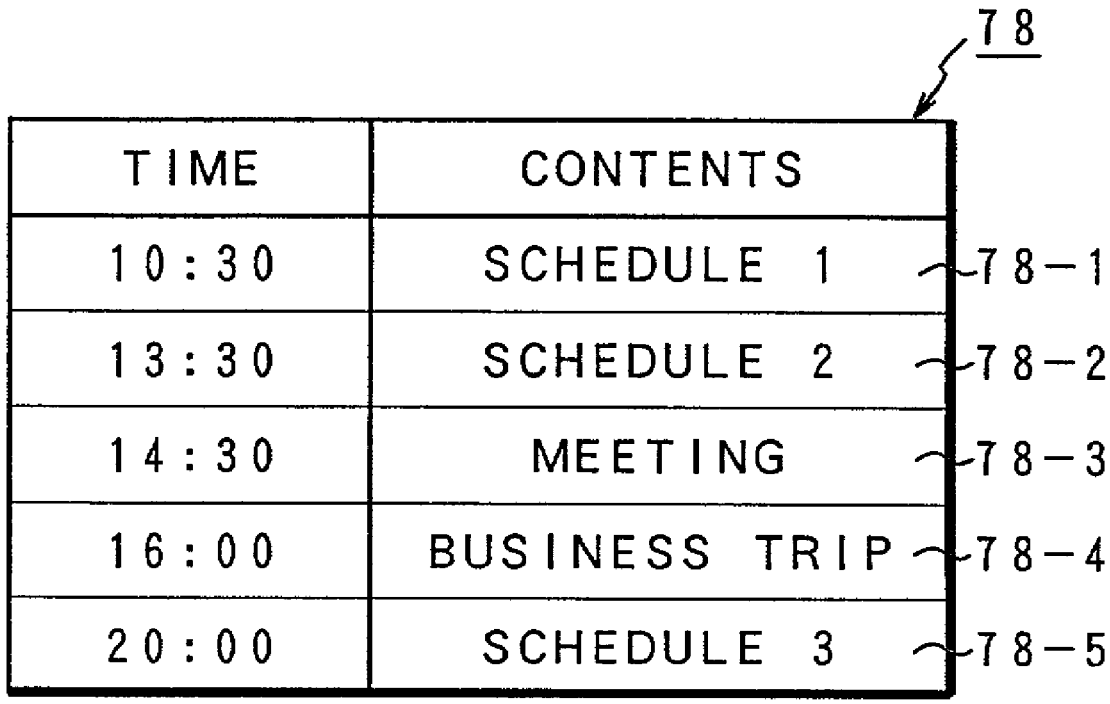
FIG. 5 is a descriptive view of displayed data of a plurality of schedules.

FIG. 5 illustrates schedule display data 78 in a case where there are a plurality of schedules displayed in the schedule display frame 70 shown in FIG. 4: schedule display data 78-1 to 78-5 are prepared on the basis of the schedule display record 24 by time of the day and contents. FIG. 6 specifically shows one of the schedule information records 24 deployed in the control unit 32 shown in FIG. 3. The schedule information record 48-1 has pieces of information including an ID, followed by a case name 102, a place 104, contents 106, date and time of starting 110, date and time of end 114, a classification 120, a requester 122, a requested party 124, a priority 126, a display color 128, an event 130 and a secret 132. These pieces of information can be entered through a schedule table preparing screen 100 shown in FIG. 7.

Figure 7:
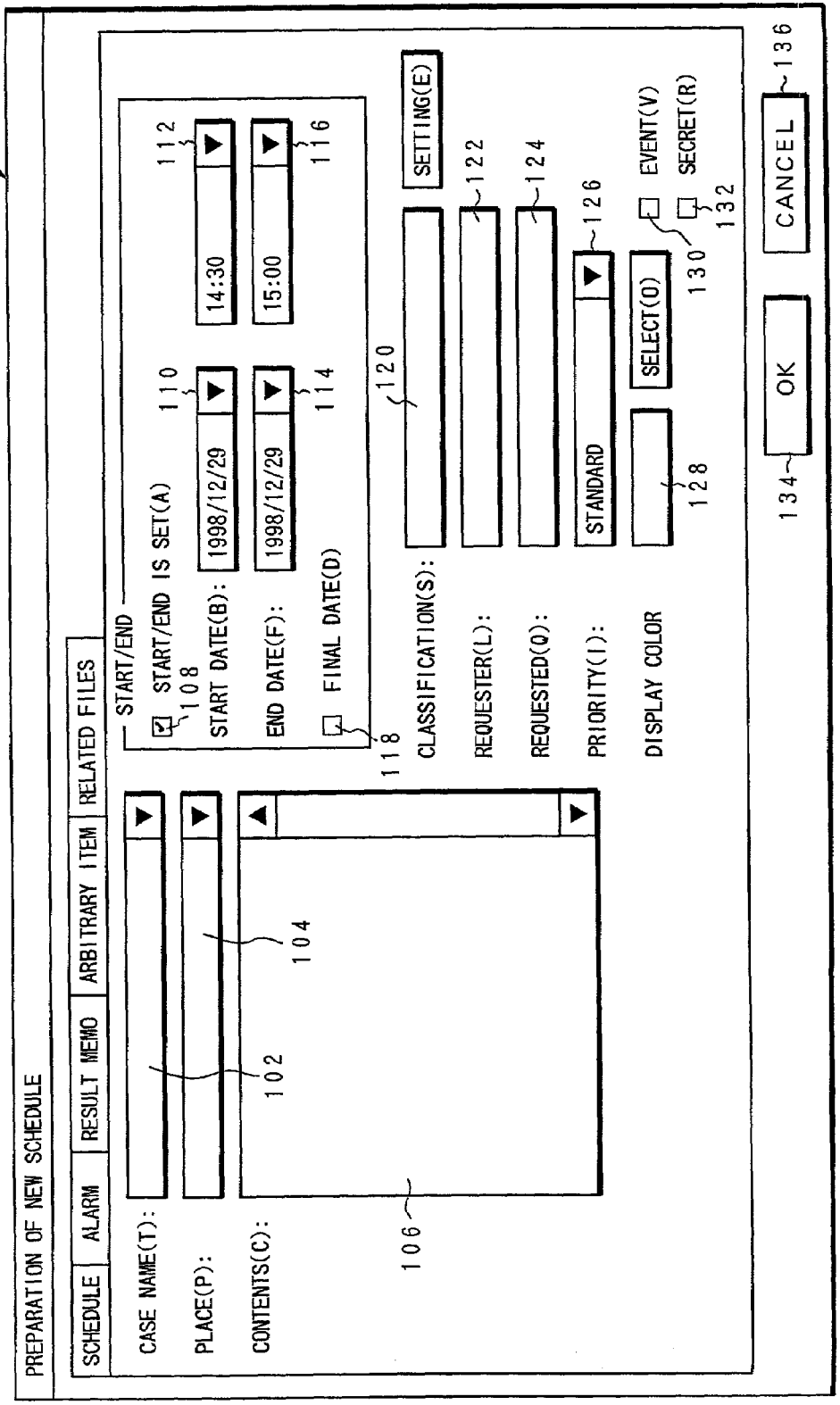
FIG. 7 is a descriptive view of a schedule table preparing screen used in the invention.
Figure 8:
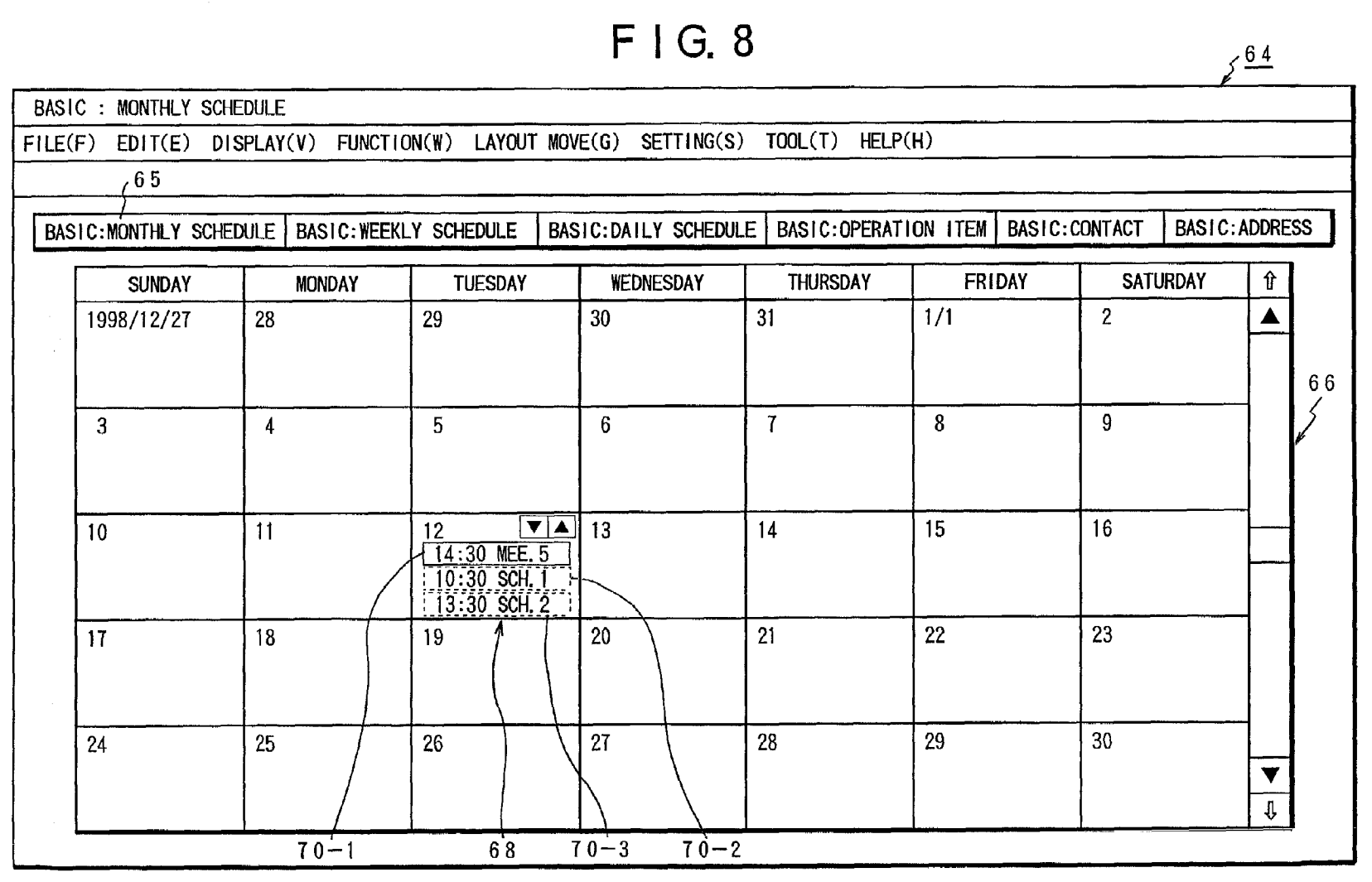

In the schedule table preparing screen 100 shown in FIG. 7, there is shown a case name 102 at left top, followed by a place 104, and then, contents 106 thereunder. At right top, a start/end setting button 108 is provided. It is possible to set a start and an end by operating this button. This is followed by an operating button of the starting date, an operating button of the starting time of the day 112, an operating button of the ending date 114, an operating button of an ending time of the day 116, and then, an operating button of the ending date 118. This is followed by input frames for a classification 120, a requester 122, a requested part 124, a priority 126, and a display color 128. Furthermore, an event 130 and a secret 132 are provided at right bottom. When the event 130 is turned on, an event display is given, fixedly displaying the schedule contents. At the right bottom corner, there are provided an OK button 134 and a cancel button 136. When there are a plurality of schedules for the schedule display data 78 as shown in FIG. 5, in the schedule display screen 64 shown in FIG. 4, a schedule display frame 70 is provided in the date frame 68 for January 12 of the monthly schedule table 66 for display of the schedule. When the schedule display screen 64 is enlarged to the full size through mouse operation as shown in FIG. 8, it is possible to display three schedule display frames 70-1, 70-2 and 70-3, for example, in the date frame 68, thereby permitting display of three schedules in succession in time.

FIG. 9 illustrates the display screen of a weekly schedule table 76 when mouse-operating a weekly schedule selecting button 74 in the schedule display screen 64. In the display screen of the weekly schedule table 76, the schedule table for a week, for example, from January 17 through 23 is displayed with a date represented by the abscissa and a time of the day represented by the ordinate. In this weekly schedule table 76, a schedule can be displayed in units of hour. It is not therefore necessary to display the schedule by means of schedule display frames as shown in the monthly schedule table 66 given in FIG. 4 or 8. When the display size of the weekly schedule table 76 is reduced, the schedule cannot be displayed by hour. The schedule is therefore switching-displayed by means of schedule display frames 70 as in the case of the monthly schedule table 66.

Figure 10:
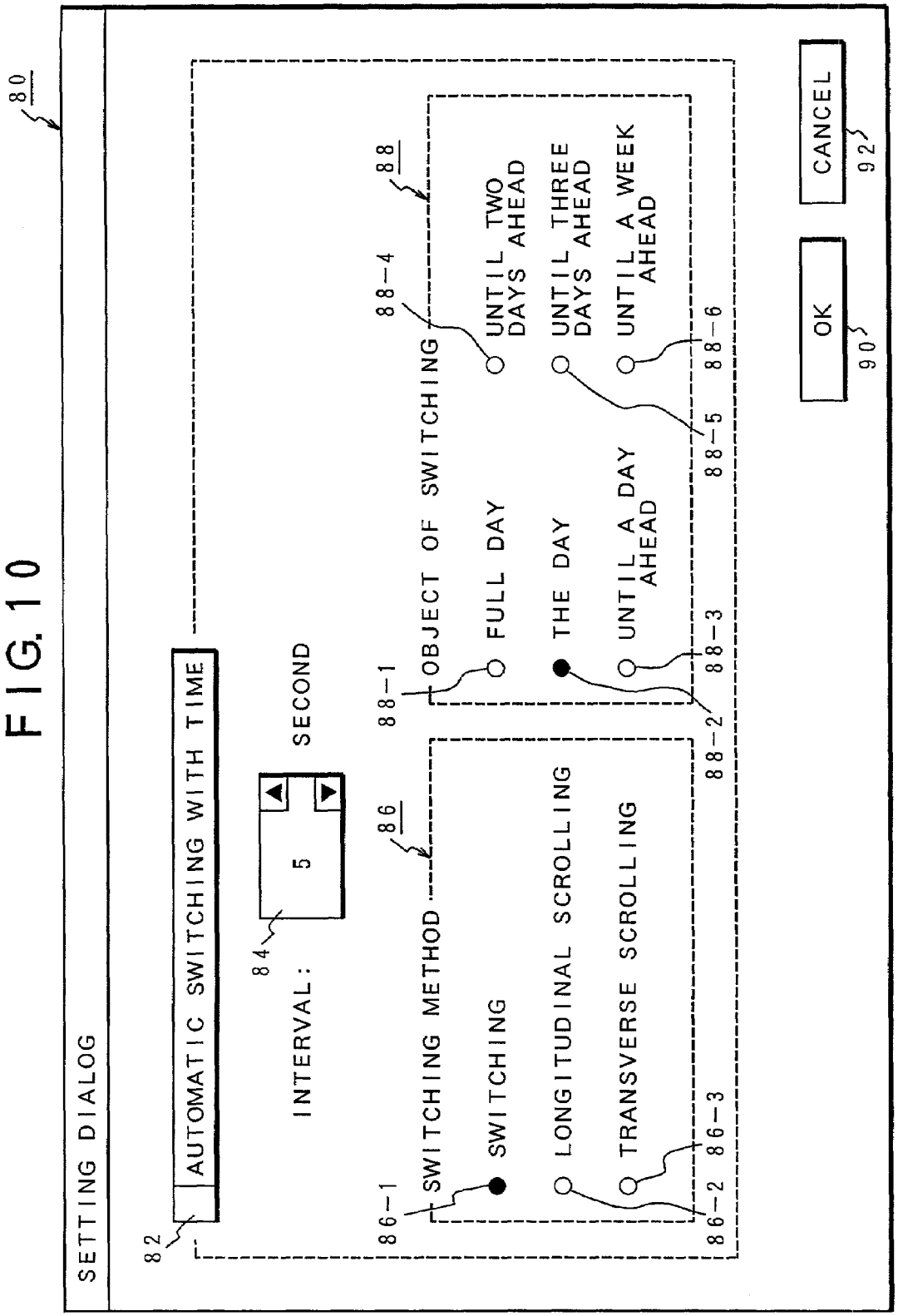
FIG. 10 is a descriptive view of a switching control screen used for switching control of schedule display in the invention.

FIG. 10 is a descriptive view of a switching control screen 80 for achieving operating functions of a switching time specifying unit 38, a switching method selecting unit 40 and a switching display frame specifying unit 42 provided in the display switching unit 36 shown in FIG. 3. An automatic switching selecting button 82 is provided in the switching control screen 80. By clicking this automatic switching selecting button 82 with the mouse, the automatic switching function of schedules by hour becomes valid. A time interval for automatically switching over the schedule is set in the next switching time setting frame 84. This time interval is increased in units of second, for example, for each operation of the scroll button 84-1, and reduced in units of second for each operation of the scroll button 84-2, thus permitting setting of any arbitrary time interval required. Setting of this time interval is accomplished, for example, by setting five seconds as shown in FIG. 10 as a default. Then, a switching method 86 for achieving the function of the switching method selecting unit 40 shown in FIG. 3 is provided. For this switching method 86, there are available a collective switching button 86-1, a longitudinal scroll button 86-2 and a transverse scroll button 86-3. In this embodiment, the collective switching button 86-1 is specified with the mouse. A switching object 88 for achieving the function of the switching display frame specifying unit 42 shown in FIG. 3 is provided to the right of the switching method specifying unit. For this switching object 88, there are provided a previous day specifying button 88-1, a current day specifying button 88-2, a one-day ahead specifying button 88-3, a two-day ahead specifying button 88-4, a three-day ahead specifying button 88-5, and a one-week ahead specifying button 88-6. In this embodiment, the current-day specifying button 88-2 is selected by the mouse operation for specification. Further toward the bottom, an OK button 90 and a cancel button 92 are provided.

Figure 11:
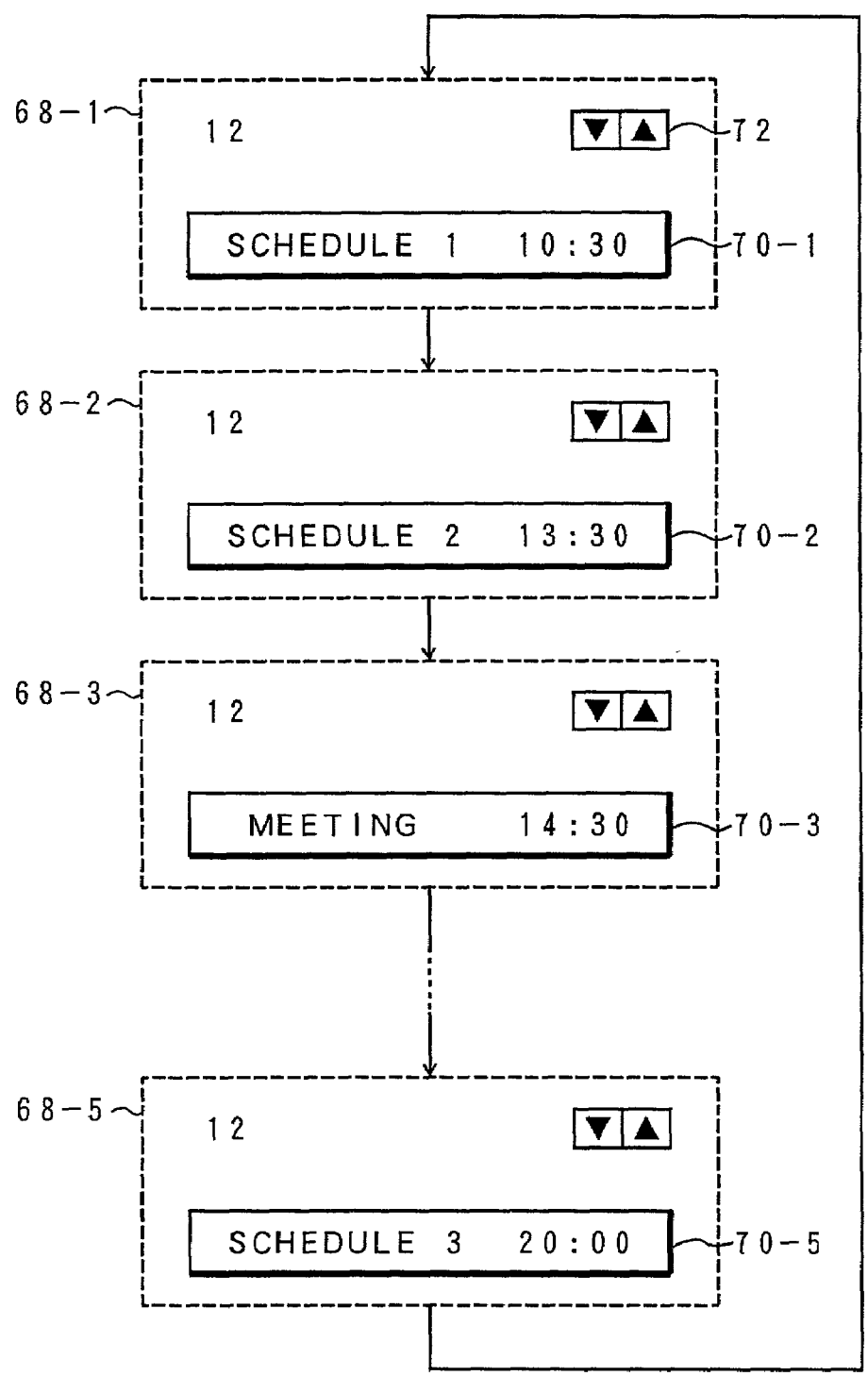
FIG. 11 is a descriptive view of a collective switching display in the invention.

FIG. 11 illustrates display switching in a case where the collective switching of schedule display is selected by the collective switching button 86-1 in the switching method specifying unit 86 of the switching control screen 80 shown in FIG. 10, using the schedule display data 78 shown in FIG. 5 as an example. More specifically, for five schedule display data 78-1 to 78-5 shown along with the lapse of time, the first data "Schedule 1 10:30" is displayed first in the schedule display frame 70-1 as shown in the date frame 86-1. Upon the lapse of a switching time interval of five seconds specified in the switching time interval window 84 shown in FIG. 10, the display is switched over to "Schedule 2 13:30" in the schedule display frame 70-2 shown in the date frame 68-2. Subsequently, the display is sequentially switched over to the third, the fourth and the fifth schedules at intervals of five seconds as shown in the date frames 68-3 to 68-5. Upon the completion of display of the fifth schedule display frame 70-5, the display returns back to the first schedule display frame 70-1, i.e., display by a round robin of a plurality of schedules is repeated.

Figure 12:
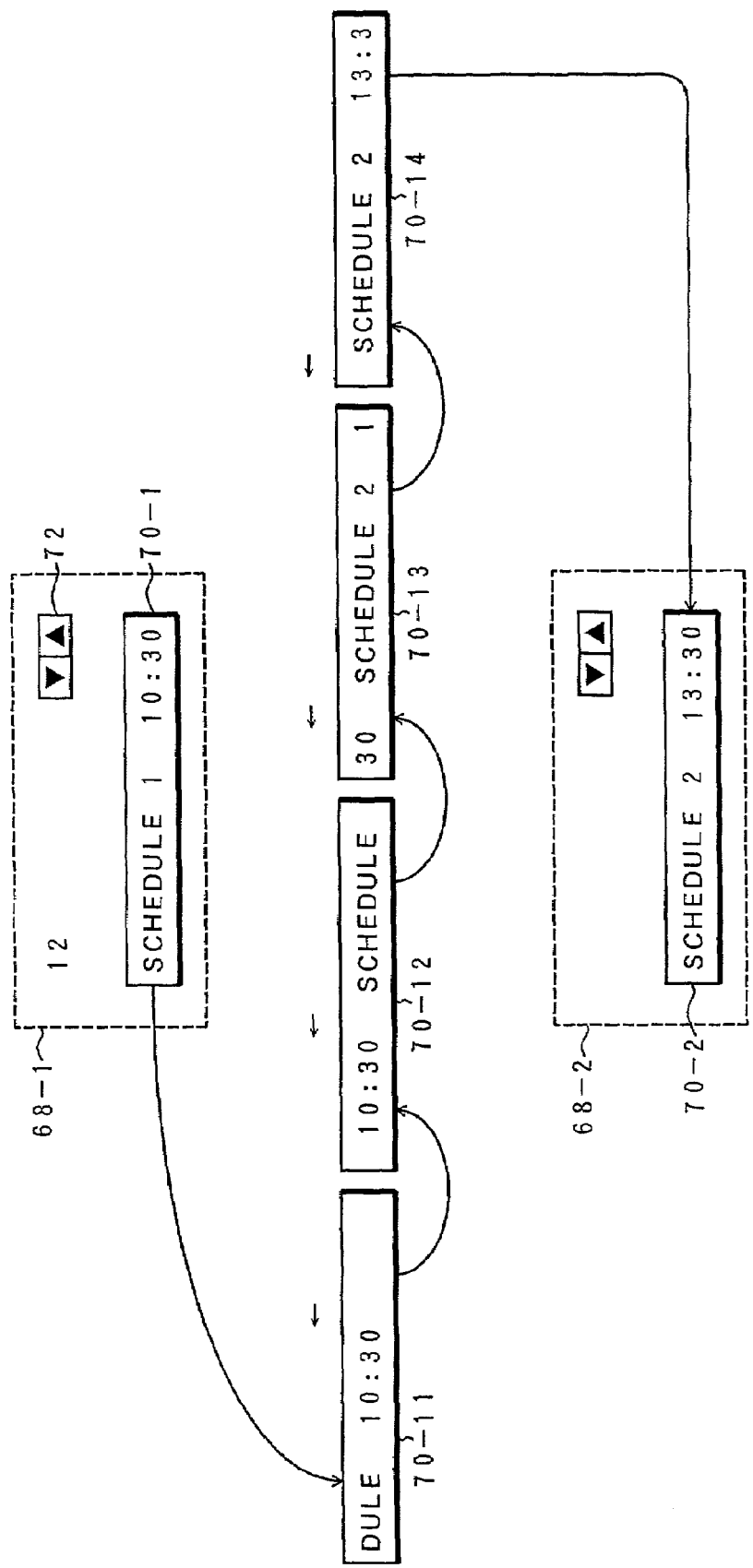
FIG. 12 is a descriptive view of a transverse scroll display in the invention.

FIG. 12 illustrates, as the switching method 86 shown in FIG. 9, a case where the transverse scroll switching method is selected by operating the transverse scroll button 86-3. In this case, upon switching over the first display in the schedule display frame 70-1 to the next schedule display frame 70-2, the next schedule "Schedule 2 13:30" following the first display data "Schedule 1 10:30" taking the place of the first while moving from left to right, as is known from the schedule display frames 70-11 to 70-14 showing changes in transverse scroll.

Figure 13:
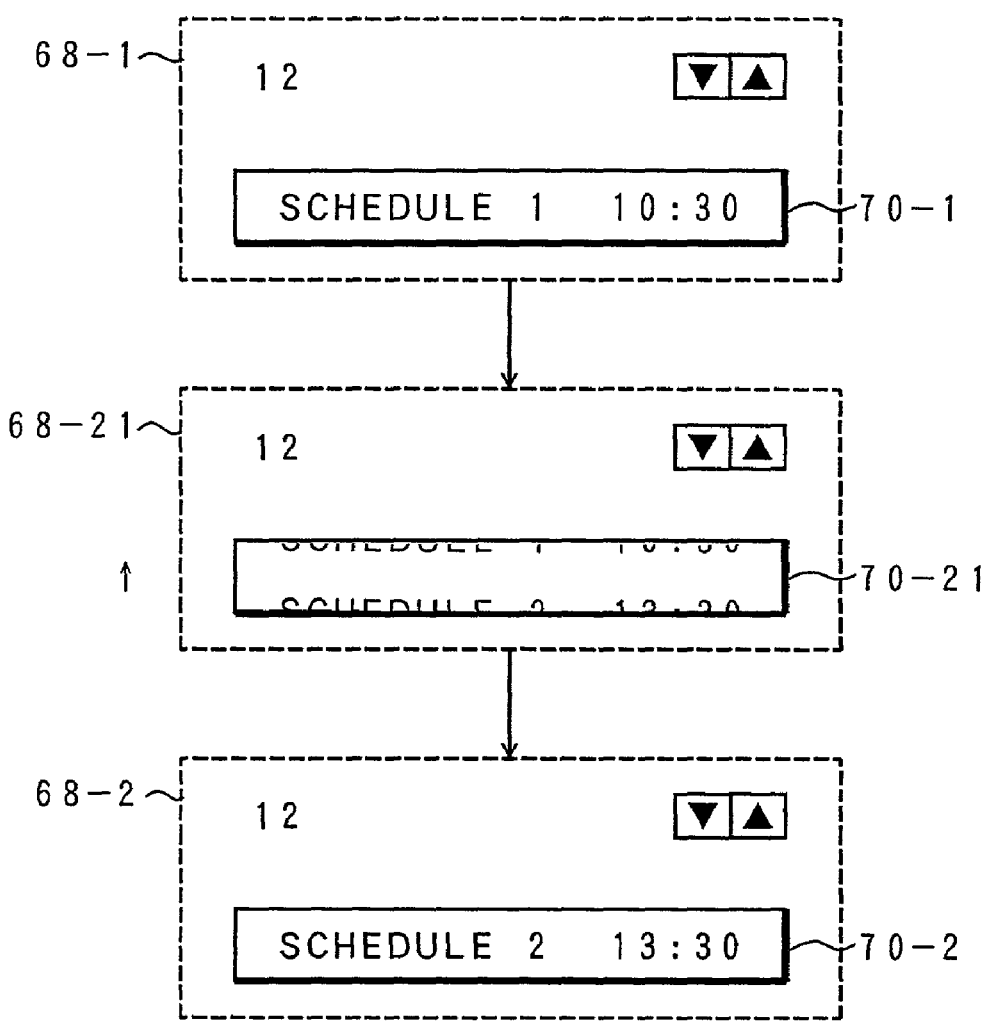
FIG. 13 is a descriptive view of a longitudinal scroll display in the invention.

FIG. 13 illustrates schedule display switching by longitudinal scrolling in a case where the longitudinal scroll button 86-2 is selected by mouse operation in the switching method 86 shown in FIG. 10. More specifically, FIG. 13 covers a case where the schedule display frame 70-1 of the date frame 68-1 is switched over to the contents of the schedule display frame 70-1 of the date frame 68-2 by longitudinal scrolling. When a set time interval of, for example, five seconds is reached, the first schedule display data move up as the schedule display frame 70-21 of the date frame 68-21 in the middle of switching by longitudinal scrolling, and then, the next schedule display data appear from below, and the schedule display is switched over to the next schedule display frame 70-2. Furthermore, collective switching, longitudinal scroll switching or transverse scroll switching in accordance with any of the switching methods of schedule display is automatically accomplished within a specified range by specifying a range of automatic switching as provided in the switching object 88 shown in FIG. 10.

Figure 14:
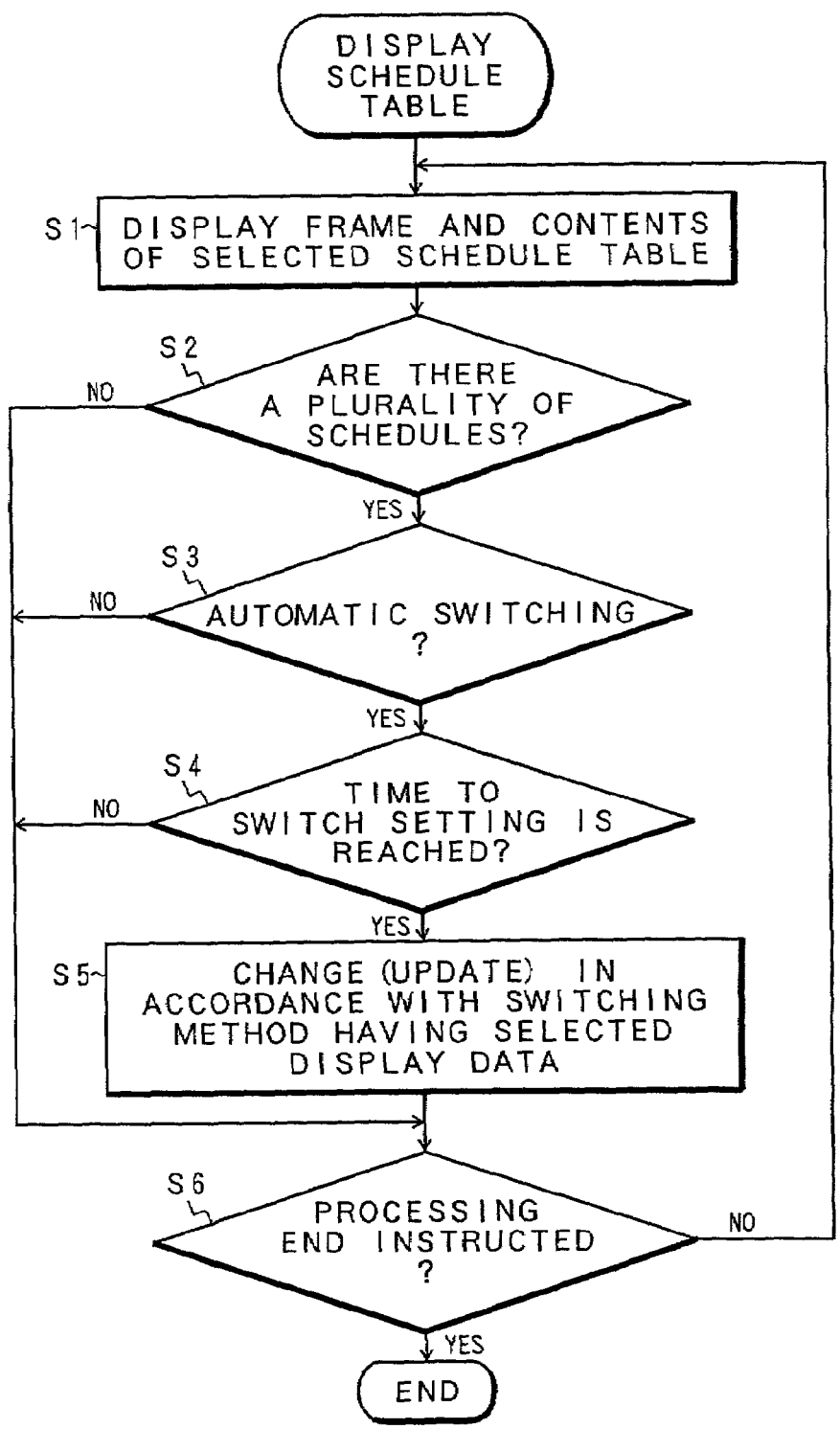
FIG. 14 is a flowchart of schedule display processing of the invention.

FIG. 14 is a flowchart of schedule display processing according to the schedule management apparatus shown in FIG. 3. When schedule display processing is started up, the frame and the contents of a selected schedule table such as a monthly schedule table are displayed, for example, as shown in FIG. 4, in step S1. If a switching object is selected during the current day, step S2 checks up if there is a single schedule or a plurality of schedules for that date. If there are a plurality of schedules, the process advances to step S3, and it is checked up if automatic switching is selected or not by the switching control screen 80 shown in FIG. 10. If automatic switching is selected, the process goes to step S4, to check up if a set switching time has been reached or not. If it has been reached, the process proceeds to step S5, to change the displayed data in accordance with any of collective switching, longitudinal scroll switching and transverse scroll switching selected on the switching control screen 80 of FIG. 10, and the next schedule is displayed. These steps S1 to S5 are repeated until a processing end instruction of the schedule display processing is issued in step S6.

According to the present invention, as described above, it is possible to simply and easily confirm all the schedules for the day without the need for carrying out operation of a scroll button or the keyboard, by automatically switching over the schedule display when there are a plurality of schedules, thus permitting easy-to-use and convenient display of schedules. Because any arbitrary switching time interval can be set, it is possible to provide automatic switching of schedules in response to user's preference. Furthermore, since the range of automatic switching of a plurality of schedules can be specified as the current day, one-day ahead, and two-day ahead or the like in compliance with user's need, schedule display can be appropriately effected in response to user's need. In the aforementioned embodiments, the case of schedule display for only one date frame 68 has been explained to simplify description of the monthly schedule table 66 of FIG. 4. It is possible to arbitrarily display schedules and carry out automatic switching thereof in accordance with the date of schedule or the number of schedules for that data. In the above-mentioned embodiments, the range of automatic switching of schedules has been specified as the previous day, or the current day, by use of the switching display frame specifying unit 42 of FIG. 3. Automatic switching display of schedules may be conducted only for the current day or any previously fixed range, without this specifying function. The present invention is not limited to the above-mentioned embodiments, but comprises appropriate variants so far as the objects and the advantages of the invention are not impaired, and is not limited by numerical values presented in the above-mentioned embodiments.

What is claimed is:

1. A schedule management apparatus displaying a plurality of managed schedules in schedule display frames, comprising:
   a schedule display control unit displaying a single schedule event at a time in each of said corresponding schedule display frames; and
   a display switching unit switching over event contents of the display in said schedule display frames displaying the schedules to display another event contents at prescribed time intervals in a looping manner.

2. An apparatus according to claim 1, wherein, when there are a plurality of schedules, said display switching unit switches over the event contents of display in said schedule display frames in units of schedule.

3. An apparatus according to claim 1, wherein said display switching unit has a time specifying unit specifying an arbitrary switching time interval.

4. An apparatus according to claim 1, wherein said display switching unit switches over the event contents of display by any of the collective switching method, the longitudinal scroll switching method or the transverse scroll switching method of the event contents of display in said schedule display frames.

5. An apparatus according to claim 1, wherein said display switching unit has a switching method selecting unit which selects a switching method of the contents of display in said schedule display frame.

6. An apparatus according to claim 1, wherein said schedule display control unit displays a monthly schedule table or a weekly schedule table, and simultaneously, displays a schedule in one or more schedule display frames from among the date frames of said monthly schedule table and said weekly schedule table, said display switching unit switching and displaying the schedule in said schedule display frame.

7. A schedule management method causing display of a plurality of schedules in management in schedule display frames, comprising:
   a schedule display controlling operation displaying a single schedule event at a time in corresponding schedule display frames; and
   a display switching operation of switching over the event contents of display in said schedule display frames displaying the schedules at prescribed switching time intervals in a looping manner.

8. A method according to claim 7, wherein, when there are a plurality of schedules, said display switching operation switching the event contents of display in said schedule display frames in units of schedule.

9. A method according to claim 7, wherein said display switching operation is provided with a time specifying operation specifying an arbitrary switching time interval.

10. A method according to claim 7, wherein said display switching operation comprises switching the event contents of display by any of the collective switching method, the longitudinal scroll switching method and the transverse scroll switching method of the event contents of display in said schedule display frames.

11. A method according to claim 7, wherein said display switching operation has a switching method selecting operation which selects a switching method of the event contents of display in said schedule display frames.

12. A method according to claim 7, wherein said method has a switched display frame specifying operation for specifying one or more schedule display frames in which the switched event contents are to be displayed.

13. A method according to claim 12, wherein said switched display frame specifying operation comprises switching and displaying schedules by specifying all schedule display frames, a schedule display frame for the day or schedule display frames for a period from the day to a prescribed number of days ahead.

14. A method according to claim 7, wherein said schedule display control operation displays a monthly schedule table or a weekly schedule table, and simultaneously, displays a schedule in one or more schedule display frames from among the date frames of said monthly schedule table and said weekly schedule table, said display switching operation switches and displays the schedule in said schedule display frames.

15. A computer-readable recording medium storing a schedule management program for a plurality of schedules, wherein said schedule management program comprising the following operations for causing said computer to execute:
a schedule display controlling operation of causing a single schedule event at a time of the schedules to be displayed in each one of the corresponding schedule display frames; and
a display switching operation of switching over the event contents of the display in said schedule display frames displaying the schedules at prescribed switching time intervals in a looping manner.

16. A medium according to claim 15, wherein, when there are a plurality of schedules, said display switching operation switching the event contents of display in said schedule display frames in units of schedule.

17. A medium according to claim 15, wherein said display switching operation is provided with a time specifying unit specifying an arbitrary switching time interval.

18. A medium according to claim 15, wherein said display switching operation comprises switching the event contents of display by any of the collective switching method, the longitudinal scroll switching method and the transverse scroll switching method of the event contents of display in said schedule display frames.

19. A medium according to claim 15, wherein said display switching operation has a switching method selecting operation which selects a switching method of the event contents of display in said schedule display frames.

20. A medium according to claim 15, wherein said medium has a switched display frame specifying operation for specifying one or more schedule display frames in which the switched event contents are to be displayed.

21. A medium according to claim 20, wherein said switched display frame specifying operation switches and displays schedules by specifying all schedule display frames, a schedule display frame for the day or schedule display frames for a period from the day to a prescribed number of days ahead.

22. A medium according to claim 15, wherein said schedule display controlling operation displays a monthly schedule table or a weekly schedule table, and simultaneously, displays a schedule in one or more schedule display frames from among the date frames of said monthly schedule table and said weekly schedule table, said display switching operation switching and displaying the schedule in said schedule display frames.

23. A schedule display method, comprising:
displaying a portion of a calendar having calendar time period display frames and having schedules of events for one of the calendar time display frames and with a single one of the schedule events being displayable at a time in a corresponding one of the calendar time period display frames; and
automatically rotating through displaying of each of the events in a looping manner one at a time in the one of the time periods for a predetermined time.

* * * * *